(12) United States Patent
Riddles

(10) Patent No.: US 11,746,508 B2
(45) Date of Patent: Sep. 5, 2023

(54) CONTROL VALVE

(71) Applicant: Creative EC Limited, London (GB)

(72) Inventor: Philip John Riddles, West Byfleet (GB)

(73) Assignee: Creative EC Limited, London (GB)

( * ) Notice: Subject to any disclaimer, the term of this patent is extended or adjusted under 35 U.S.C. 154(b) by 0 days.

(21) Appl. No.: 17/255,050

(22) PCT Filed: Jun. 21, 2019

(86) PCT No.: PCT/GB2019/051764
§ 371 (c)(1),
(2) Date: Dec. 22, 2020

(87) PCT Pub. No.: WO2019/243843
PCT Pub. Date: Dec. 26, 2019

(65) Prior Publication Data
US 2021/0164199 A1    Jun. 3, 2021

(30) Foreign Application Priority Data
Jun. 22, 2018  (GB) ..................................... 1810259

(51) Int. Cl.
*E03B 7/07* (2006.01)
*G01M 3/28* (2006.01)
*E03B 7/00* (2006.01)

(52) U.S. Cl.
CPC ........... *E03B 7/071* (2013.01); *G01M 3/2807* (2013.01); *E03B 7/00* (2013.01); *E03B 7/003* (2013.01); *E03B 7/072* (2013.01); *E03B 7/075* (2013.01); *Y02A 20/15* (2018.01); *Y02B 10/50* (2013.01)

(58) Field of Classification Search
CPC .......... E03B 7/071; E03B 7/003; E03B 7/072; E03B 7/075; E03B 7/00; G01M 3/2807; Y02A 20/15; Y02B 10/50
USPC ................................................ 137/312, 487.5
See application file for complete search history.

(56) References Cited

U.S. PATENT DOCUMENTS

| | | | |
|---|---|---|---|
| 6,491,062 B1 * | 12/2002 | Croft .................... | G01M 3/2807 137/624.11 |
| 6,662,821 B2 * | 12/2003 | Jacobsen ................. | F16K 31/05 137/2 |
| 7,620,065 B2 * | 11/2009 | Falardeau ............. | H04W 48/18 370/465 |
| 8,130,107 B2 * | 3/2012 | Meyer .................. | G05D 7/0617 340/605 |
| 9,049,821 B1 * | 6/2015 | Hanna .................... | A01G 25/16 |

(Continued)

FOREIGN PATENT DOCUMENTS

| | | |
|---|---|---|
| CN | 201116508 Y | 9/2008 |
| CN | 201661722 U | 12/2010 |

(Continued)

OTHER PUBLICATIONS

Wang Hao et al: "Development of a Digital and Battery-Free Smart Flowmeter", Energies, vol. 7, No. 6, Jun. 16, 2014.

*Primary Examiner* — Minh Q Le

(57) ABSTRACT

The invention relates in part to an autonomous, self-powered valve for continuous monitoring of water flow within a domestic or commercial water pipe network. The invention also relates to a network in which the valve is remotely monitored for detection of abnormalities in water use patterns.

12 Claims, 2 Drawing Sheets

(56) References Cited

U.S. PATENT DOCUMENTS

| | | | | |
|---|---|---|---|---|
| 10,150,145 | B1* | 12/2018 | McNeil | G01F 11/00 |
| 10,945,109 | B2* | 3/2021 | Nies | H04W 4/80 |
| 11,047,496 | B1* | 6/2021 | McConnell | G01M 3/2815 |
| 11,105,705 | B1* | 8/2021 | Lowitz | G05D 7/0641 |
| 2006/0258285 | A1* | 11/2006 | Riddles | H04W 48/20 |
| | | | | 455/41.2 |
| 2007/0084512 | A1* | 4/2007 | Tegge | B63B 43/02 |
| | | | | 137/487.5 |
| 2007/0289635 | A1* | 12/2007 | Ghazarian | F17D 5/06 |
| | | | | 137/312 |
| 2008/0078973 | A1* | 4/2008 | Richards | G01M 3/2807 |
| | | | | 251/315.1 |
| 2013/0131874 | A1* | 5/2013 | Shupe | H04W 4/00 |
| | | | | 700/284 |
| 2014/0230924 | A1* | 8/2014 | Kochan, Jr. | E03B 7/071 |
| | | | | 137/487.5 |
| 2015/0013772 | A1 | 1/2015 | Patel et al. | |
| 2017/0089047 | A1* | 3/2017 | Kovscek | G01F 1/666 |
| 2017/0285665 | A1 | 10/2017 | Nunally et al. | |
| 2017/0308796 | A1* | 10/2017 | Heng | G06N 5/048 |
| 2018/0112376 | A1* | 4/2018 | Beger | E03B 7/071 |
| 2018/0112785 | A1* | 4/2018 | Shaffer | F17D 5/02 |
| 2018/0195926 | A1* | 7/2018 | Barker | E03B 7/075 |
| 2018/0230681 | A1* | 8/2018 | Poojary | E03B 7/078 |
| 2018/0274212 | A1* | 9/2018 | Kuchly | F16K 37/0041 |
| 2018/0334786 | A1* | 11/2018 | Sharratt | E03B 7/071 |
| 2018/0347157 | A1* | 12/2018 | Brotherton | F17D 5/02 |
| 2019/0025151 | A1* | 1/2019 | Jestice | E03B 7/003 |
| 2019/0377369 | A1* | 12/2019 | Evans | F17D 5/06 |
| 2020/0133315 | A1* | 4/2020 | Rasmussen | G08B 25/10 |
| 2020/0300664 | A1* | 9/2020 | Zhou | G01D 4/006 |
| 2021/0079630 | A1* | 3/2021 | Poojary | G05B 19/048 |
| 2021/0164860 | A1* | 6/2021 | Young | E03B 7/071 |

FOREIGN PATENT DOCUMENTS

| | | |
|---|---|---|
| CN | 207276747 U | 5/2018 |
| NZ | 531000 B | 9/2004 |

* cited by examiner

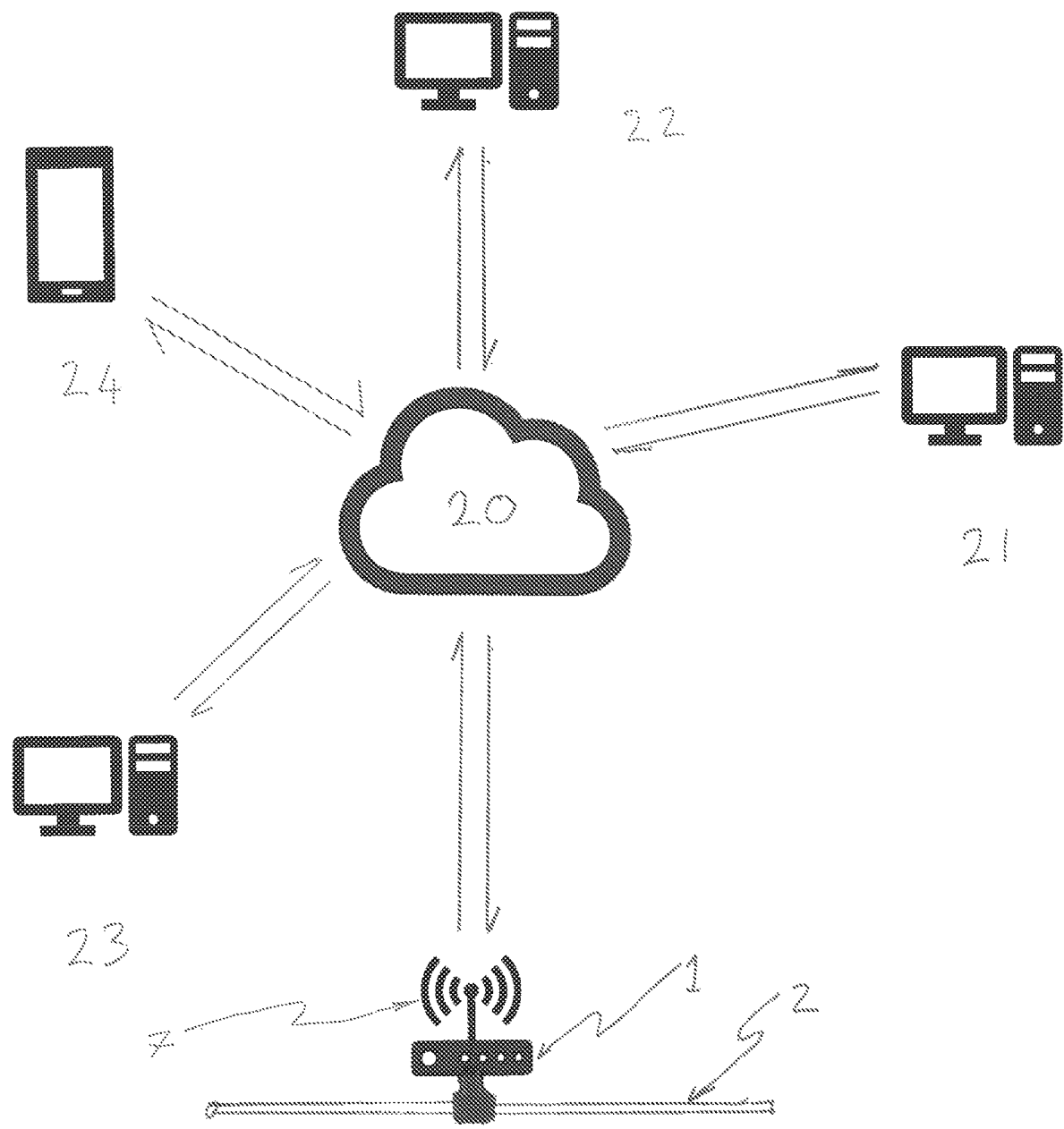

CONTROL VALVE

FIELD OF THE INVENTION

The invention concerns a device and the method of use of a water supply system control and/or monitoring valve. More particularly, the invention relates to a water monitor and use detection system for real time water use and leak detection in water supply.

BACKGROUND OF THE INVENTION

Water conservation is a major issue for individuals and society. As the population increases, so do the demands placed on the water supply system. Conservation of this increasingly scarce resource therefore remains a problem.

A major cause of water loss is leaks in domestic and industrial premises. Water supply companies generally have dedicated resources directed towards minimizing and preventing leaks; however such resources are generally not available to homeowners and industrial concerns, and consequently water wastage in such establishments is widespread.

The cumulative total of water losses in residential property and industrial/commercial facilities caused by broken water pipes, or unobserved leaks are significant. For example, toilets can and do routinely siphon water at a slow rate; the total amount of wasted water over one year, however, is very large. A single overflowing toilet cistern can waste 100,000 litres of water a year.

A further problem is that water leaks in domestic and other properties can remain undetected for substantial periods of time. This can result not only in water wastage, but damage to the property and contents which can be costly to repair. Such leaks are particularly damaging and destructive if they occur during a period when the occupant is away from the property, such as when they are on holiday.

A further problem is that of water use in properties that are inhabited by the elderly, infirm, or individuals with other physical and/or cognitive difficulties. Such individuals frequently leave appliances (such as baths) running and are unable or forget to attend to them, so causing water overflows with consequent damage. Additionally, such individuals can suffer accidents and injuries in a domestic context, which often go undetected by caregivers or family members for extended periods of time.

BRIEF DESCRIPTION OF THE PRIOR ART

Several automated water detection and/or control systems are known.

US20120026004A1 discloses a method for monitoring a home for a leak within a home network that includes at least one water meter for measuring water consumed by water consuming devices within the network and a central controller communicatively linked to the at least one water meter, the central controller including at least one memory for storing executable instructions.

US20150013772A1 discloses a method of closing or opening a manual valve coupled to a conduit for e.g. water, comprising receiving a signal indicative of an instruction to close the manual valve, and in response to the signal, removing a barrier provided between a source of stored potential energy and an actuator coupled to the manual valve; and rotating the manual valve using the actuator.

US20130248023A1 discloses a remotely activated fluid control system prevents damage from leaking fluids (such as water or gas) escaping from damaged pipes by providing a user-activated controlling device that allows the user to activate a remote inline first shut-off valve in the main fluid supply line, such as when leaving the building.

A problem that remains is that known automated water control systems are cumbersome to install, and require access to an electrical power supply in order to actuate, and transmit and receive data.

A further problem is that many known automated water control systems require the presence of remote water detection sensors. This relies on a leak occurring in one of the areas where the sensor is located.

The present invention addresses these and other problems known in the art.

SUMMARY OF THE INVENTION

According to a first embodiment, the invention relates to a device for monitoring and controlling the flow of water through a pipe, comprising:
a. at least one detector which measures an environmental parameter of water in said pipe,
b. a valve which controls the flow of water through said pipe, an electrical actuator operably coupled to the valve,
c. a radiofrequency transmitter for transmitting data relating to the at least one environmental parameter,
d. a radiofrequency receiver for receiving a signal; and
e. a computer processing module adapted to record and store data generated by the detector or detectors,
wherein
the computer processing module is in data communication with the radiofrequency transmitter and radiofrequency receiver, and
the electrical actuator moves in response to a signal generated by the computer processing module.

According to a second embodiment, the invention relates to a device for monitoring and controlling the flow of water through a pipe, comprising: a detector which measures at least one environmental parameter of water in said pipe, a hydroelectric power generator driven by the flow of water in said pipe that generates an electrical current, an electrical storage means that stores electrical charge generated by said hydroelectric power generator, a valve which flow of water through said pipe, an electrical actuator operably coupled to the valve and powered by electrical charge stored in said electrical storage means, a radiofrequency transmitter for transmitting data relating to the at least one environmental parameter, and a radiofrequency receiver for receiving a signal
wherein
the electrical actuator moves in response to the signal received by the radiofrequency receiver.

According to a third embodiment, the invention relates to a computer network system comprising a device of the invention and a remote central computing apparatus adapted to receive data from the device.

DETAILED DESCRIPTION OF THE PREFERRED EMBODIMENTS

In one aspect, the invention relates to a device for monitoring and controlling the flow of water in a pipe for achieving the objectives of preventing damaging leaks and consequent floods, and capturing data relating to water consumption and properties. The captured data may be of use to the end user (e.g. a water consumer) or may provide information relating to abnormal patterns of use to a remote monitoring service. This, in turn, may provide an indication of a leak in a property, or that an occupant has suffered a mishap.

The device of the invention comprises at least one detector which measures an environmental parameter of water within the pipe. Environmental parameters are usually flow rate, pressure and/or temperature, however other parameters (such as pH) may be contemplated.

In one preferred embodiment, the environmental parameter is flow rate.

Flow rate may be measure by a number of different means known in the art. In one embodiment, the detector is a mechanical apparatus for measuring flow, preferably a turbine flowmeter. Turbine flowmeters use the mechanical energy of the water to rotate a rotor in the flow stream. Blades on the rotor are angled to transform energy from the flow stream into rotational energy. The rotor shaft spins on bearings. Blade movement may be detected magnetically, with each blade generating a pulse. When the fluid moves faster, more pulses are generated. The transmitter processes the pulse signal to determine the flow of the fluid. Transmitters and sensing systems are available to sense flow in both the forward and reverse flow directions.

Alternatively, flow rate may be measured via a measurement device that does not sit within the liquid flow (a "non-invasive" meter). Ultrasonic flowmeters are preferred. Using ultrasonic transducers, an ultrasonic flowmeter can measure the average velocity along the path of an emitted beam of ultrasound, by averaging the difference in measured transit time between the pulses of ultrasound propagating into and against the direction of the flow or by measuring the frequency shift resulting from the Doppler effect. The main types of ultrasonic flowmeters divide two groups with respect to transducer siting, namely wetted and non-wetted (including "clamp on" types). Liquid flow meters are available commercially with "clamp on" transducers. The chief advantage of this embodiment is that the meter has no moving parts, and therefore exhibits enhanced durability and reliability. Furthermore, such meters exhibit a much lower restriction on water flow.

A suitable flow meter is a transit time differential acoustic flowmeter having transducers acoustically coupled to the outside of the pipe and in contact therewith over a fractional part of the circumference of the side wall thereof. Such a device is described in WO2014016315, which is incorporated herein by reference.

In some embodiments, temperature of the water is an environmental parameter that is measured. Many types of temperature sensors suitable for this purpose are known, including thermistors, thermocouples, infrared measurement devices and resistance temperature devices (RTDs).

In some embodiments, the device of the invention comprises one temperature sensor. In other embodiments, the device of the invention comprises two temperature sensors, one on the inlet of the device, and the other on the outlet, separated by a distance of up to 1 m, such as 10-90 cm, preferably 25-75 cm, more preferably 40-60 cm, such as 50 cm. Cold water entering the system (e.g. from the mains water supply) is generally at a lower temperature than that within a building, and the difference between the two temperatures can be indicative of a flow of water due to e.g. an undetected leak.

In further embodiments, pressure of the water is an environmental parameter that is measured. Various types of pressure sensor suitable for use in this context are known.

In some embodiments, the device incorporates sensors for measuring more than one environmental parameter, such as two or more of flow rate, temperature and pressure.

In some embodiments, the device comprises a hydroelectric power generator. Various types of hydroelectric power generator are known. Those preferred are hydroelectric generator in which the turbine rotor is deployed within the water flow path of the pipe. Preferably, the turbine rotor whose rotation is effected by the flow of liquid through the pipeline also serves as the magnetic armature of the generator.

In a preferred embodiment, the hydroelectric power generator also functions as a flowmeter. The electrical current generated by the hydroelectric power generator varies according to the speed of rotation of the rotor, and therefore the rate of flow of water in the pipe.

The electrical current generated by the hydroelectric power generator is in electrical connection with, and serves to charge, the electrical storage means. Preferably, the electrical storage means is a battery or a plurality of batteries, but could alternatively be a capacitor. Various types of rechargeable batteries are suitable, including lead-acid, nickel-cadmium (NiCd), nickel-metal hydride (NiMH), lithium-ion (Li-ion), and lithium-ion polymer (Li-ion polymer).

In alternative embodiments, the device is connected to an external power supply, such as a battery or mains power supply.

The valve may be of any known type. Suitable valves are angle valves, gate valves, ball valves, globe valves, check valves, butterfly valves and air-release valves. A preferred type of valve is that disclosed in WO2010/092380 which is incorporated by reference herein in its entirety. This is a shut-off valve comprising a diaphragm valve and a pilot valve, the diaphragm valve having an inlet and an outlet, a valve member and a valve seat, the valve member having a closed position in which it engages the seat and blocks the flow of fluid from the inlet to the outlet, and an open position in which the valve member does not engage the seat and fluid can flow from the inlet to the outlet, a first fluid conduit connecting the inlet of the diaphragm valve to the inlet of the pilot valve, and a second fluid conduit connecting the outlet of the pilot valve to the outlet of the diaphragm valve, the pilot valve having an open position in which fluid can flow from the first fluid conduit to the second fluid conduit and a closed position in which fluid cannot flow from the first fluid conduit to the second fluid conduit, characterised in that the diaphragm valve has a control member which engages the valve member and can be used to hold the valve member against the valve seat.

The valve is operable coupled to an electrical actuator, which controls the degree of opening of the valve, and consequently the flow of water through the pipe. Suitable electrical actuators use an electric motor to provide torque to operate the valve.

The electrical actuator is electrically connected to the electrical storage means, and is driven by the stored electrical charge therein. It will be apparent from the foregoing that the entire unit is self-powering, and does not require connection to an external power supply. This is a great advantage in terms of installation, running costs and freedom for the installer to select the position of the device within the network of waterpipes, as they are not limited to locations where an electrical power source is present.

The radiofrequency transmitter and receiver are of any type suitable for transmitting data over a distance. Suitable transmitters/receivers include those using WiFi, Bluetooth, LoRa, NBIoT, 3G and 4G wireless WAN. A preferred transmitter is of the LoRa type, such as disclosed in EP2763321 which is incorporated by reference herein in its entirety. An alternative preferred transmitter is of the wireless WAN type. The radiofrequency transmitter/receiver may be powered by the electrical storage means, or may alternatively have its own power source. In some embodiments, the radiofrequency transmitter and receiver are combined in a device that can both transmit and receive communications, namely a transceiver. Data relating to the state of the valve (e.g. its degree of opening) may also be transmitted via the radiofrequency transmitter. Data relating to the amount of electrical charge stored within the electrical storage means Data relating to the environmental parameters and the state of the valve is transmitted via the radiofrequency transmitter to a remote central computing apparatus. This transmission may occur directly (such as via a 4G signal), or be received locally (e.g. by a local WiFi hub) and conducted to the remote central computing apparatus via the internet.

The data relating to the environmental parameters and the state of the valve is received by the remote central computing apparatus and stored in a database. The remote central computing apparatus may have a data connection to one or more further devices, such as a web interface, the water user's computer, a mobile device such as a mobile telephone. The remote central computing apparatus may have a data connection to further computers controlled by the water supply company, an insurance company, or other relevant organisations.

Historic data relating to the environmental parameters and the state of the valve is stored in a database and analysed to establish patterns of water usage. Such patterns having been identified, the central computing apparatus compares fresh data relating to the environmental parameters and the state of the valve with these patterns, and detects changes from known patterns.

In some embodiments, the central computing apparatus contains data relating to typical water use patterns of various domestic appliances. By comparing historic use data with data relating to typical water use patterns, the central computing apparatus is able to determine which appliances are being used, how frequently, and how much water is consumed by each. This information is valuable to the water user, the water company, and other interested parties.

In response to a predetermined change in patterns of data relating to the environmental parameters and the state of the valve the remote central computing apparatus is configured to take one or more actions in response. In response to a specific change, the remote central computing apparatus may transmit a signal to the user, such as to the water user's mobile device to alert them to such a change.

Alternatively, or additionally, in response to a predetermined change in patterns of data the remote central computing apparatus may transmit, directly or indirectly, a signal capable of being detected by the radiofrequency receiver.

On detection of such a signal, the receiver sends a command to the electrical actuator, which moves in response, and consequently opens or closes the valve.

Thus, in response to e.g. an unexpected sudden increase in flow rate, which may be indicative of a leak, the remote central computing apparatus compares the new environmental data with the historic data stored in the database, and detecting an abnormality, transmits a signal capable of being detected by the radiofrequency receiver which causes the valve to close, thereby preventing damage.

Alternatively, in response to e.g. an unexpected sudden increase in flow rate, the remote central computing apparatus may transmit a data signal to one or more further devices alerting a user or local water company to the increase, and requesting input to confirm the increase is a result of a legitimate event, such as the addition of a new water consuming device. The user local water company may confirm that the increase in flow rate is expected, or alternatively may confirm that it is not, and transmit this confirmation to the central computing apparatus. On receipt of confirmation in this way, the remote central computing apparatus transmits a signal capable of being detected by the radiofrequency receiver which causes the valve to close, thereby preventing damage.

Historic data stored in the database may be transmitted to the water user, who can use this information to gain knowledge of patterns of water use as well as real-time consumption. The remote central computing apparatus is in some em Information relating to the charge level of the electrical storage means may also be relayed to the water user, alerting them if the level falls critically low so that it may be connected to an external power supply.

In some embodiments of the invention, the device is provided with a computer processing module adapted to record and store data generated by the detector or detectors. The computer processing module is in data communication with the detector or detectors, and adapted to received data generated by these. In some embodiments, computer processing module comprises data storage. In some embodiments, the computer processing module is in data communication with the radiofrequency transmitter and radiofrequency receiver.

In some embodiments, data received by the computer processing module are processed by the module, and transmitted via the radiofrequency transmitter to the remote central computing apparatus.

In some embodiments, data generated by the remote central computing apparatus are received by the radiofrequency receiver, and transferred to the computer processing module. Such data are retained by the computer processing module and employed to compare real-time data with established patterns of water use.

Further aspects of the invention are now disclosed with specific reference to the figures.

FIG. 2 is a schematic diagram of the device of the invention operating within a network of computers.

FIG. 1 shows a schematic representation of a device according to one embodiment of the invention.

Figure 1:
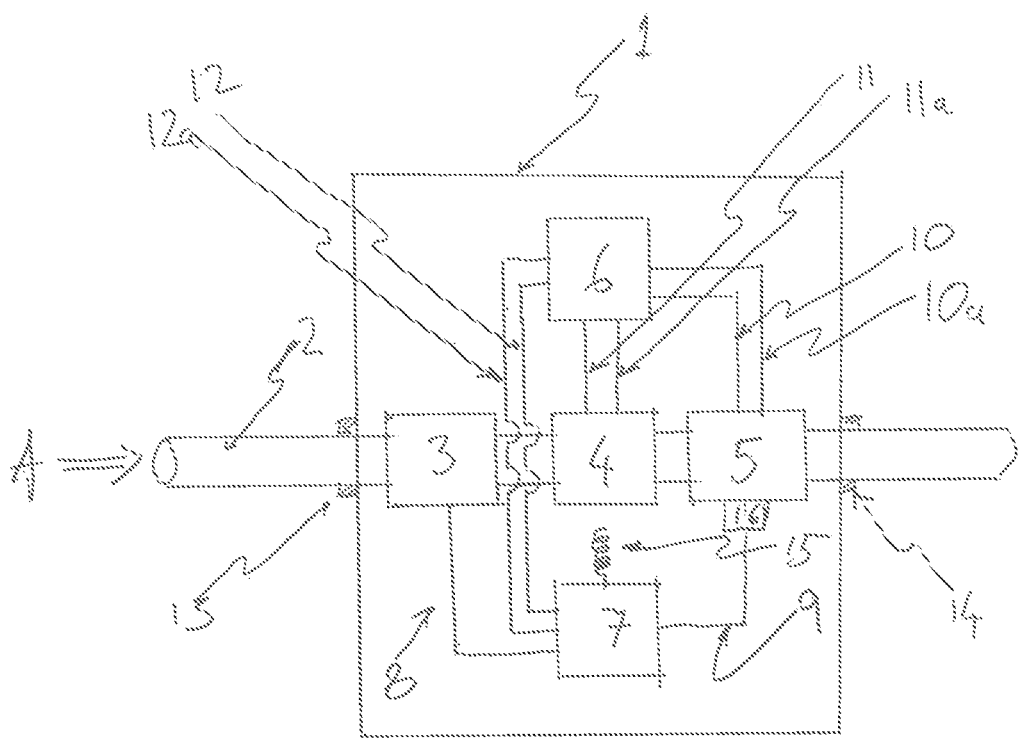
FIG. 1 is a schematic diagram of the device of the invention installed within a water pipe.

The device (1) is attached to a domestic water pipe (2) via inlet (13) and outlet (14) connectors. Device (1) comprises a detector (3) capable of measuring an environmental parameter of water. Detector (3) includes one or more suitable transponders for converting measurements of environmental parameters into digital information. Water, flowing through pipe in direction "A", enters the device through inlet connector (13), and passes through detector (3).

Data generated by detector (3) is transmitted through data link (8) to transceiver (7). Transceiver (7) includes a transmitter and a receiver, and also a processor for converting data into broadcast signal. Transceiver (7) is in electrical connection with electrical storage means (6) via positive (12) and negative (12a) electrical connectors.

On exiting detector (3), water flows through into (optional) hydroelectric power generator (4). The flow of water through hydroelectric power generator (4) produces an electrical current, which is transmitted via positive (11) and negative (11*a*) electrical connectors to electrical storage means (6). Electrical storage means (6) accumulates the electrical current generated by hydroelectric power generator (4) and stores it as electrical charge.

On exiting the hydroelectric power generator (4), water flows into valve (5). Valve (5) may be open, to permit flow of water onwards through exit connector (14), or closed so as to prevent flow of water, or at an intermediate position to restrict water flow.

Valve (5) is operably connected to transducer (16), which is configured to open or close valve (5) on receipt of the relevant data signal from transceiver (7). Transceiver (7) and transducer (16) are connected via a data link (9). Valve (5) and transducer (16) are in electrical connection via positive (11) and negative (11*a*) electrical connectors to electrical storage means (6), which provides electrical power to the valve (5) and/or transducer (16).

Under normal operating conditions, flow and other properties (such as temperature and pressure) of water through the device (1) are measured by detector (3), which converts the measurements into digital data and relays them via data link (8) to transceiver (7). Transceiver (7) broadcasts these data via antenna (15) to remote central computing apparatus. The remote central computing apparatus receives these data, compares them with historic data relating to typical use patterns, and on confirming that the data are within normal parameters, transmits a signal ("normal use signal") which is detected by transceiver (7).

On detection of the normal use signal, the transceiver sends a further signal to transducer (16) via data link (9), which is interpreted as an instruction to maintain open, or open valve (5) and permit flow of water through the exit connector (14) of the device.

If a leak is present elsewhere in the water network (e.g. upstream of input connector (14)), flow and other properties (such as temperature and pressure) of water through the device (1) are measured by detector (3), which converts the measurements into digital data and relays them via data link (8) to transceiver (7). Transceiver (7) broadcasts these data via antenna (15) to remote central computing apparatus. The remote central computing apparatus receives these data, compares them with historic data relating to typical use patterns, and detects that the data are outside normal parameters and transmits a signal ("abnormal signal") which is detected by transceiver (7).

On detection of the abnormal signal, the transceiver sends a further signal to transducer (16) via data link (9), which is interpreted as an instruction to close valve (5) and prevent flow of water through the exit connector (14) of the device.

FIG. 2 shows device (1) of the invention within a network of devices. Device (1) is located in pipe (2) within a domestic or commercial property. Via transceiver (7) it transmits data relating to the environmental parameters, battery and valve status etc. to the remote central computing apparatus (20).

The remote central computing apparatus (20) has data connections to further devices, which may be wireless or wired. The remote central computing apparatus (20) has a data connection to database (21), which stores historic data relating to the environmental parameters for each user.

The remote central computing apparatus (20) receives real time data from the user's device (1). Data, both historic and real-time, is relayed to user computer (22) and user mobile device (24) via the internet. Additionally, data, both historic and real-time, is relayed to water supply company computer (23).

The remote central computing apparatus (20) continuously compares real time data from user device with the historic data stored in database (21). On confirming that the data are within normal parameters, remote central computing apparatus (20) transmits a signal ("normal use signal") which is received by transceiver (7) of device (1). On detection of the normal use signal, water is permitted to flow through device (1) into the domestic water pipe system.

Alternatively, if the data are outside normal parameters, remote central computing apparatus (20) transmits a signal ("abnormal signal") which is received by transceiver (7) of device (1). On detection of the abnormal signal, water is prevented from flowing through device (1) into the domestic water pipe system.

Additionally, if the data are outside normal parameters, remote central computing apparatus (20) transmits to one or more of mobile device (24), computer (21) or (22). This triggers an alert to the user, and requests that they confirm that the abnormal use is expected, e.g. as a result of installation of a new appliance. If the user confirms the use is expected, this information is relayed to remote central computing apparatus (20), which continues to transmit a normal use signal. On the other hand, if the user confirm the use is indeed unexpected, remote central computing apparatus (20) is triggered to transmit the abnormal signal and so arrest flow of water through the device.

The invention claimed is:

1. A computer network system comprising:
    a device for monitoring and controlling the flow of water through a pipe, said device comprising:
    a. detectors for measuring environmental parameters of water in said pipe, said environmental parameters including flow rate and pressure,
    b. a valve which controls the flow of water through said pipe, an electrical actuator operably coupled to the valve,
    c. a radiofrequency transmitter for transmitting data;
    d. a radiofrequency receiver for receiving a signal; and
    e. a computer processing module comprising data storage adapted to record and store data generated by the detectors,
    the computer processing module being in data communication with the radiofrequency transmitter and radiofrequency receiver, and
    the electrical actuator moves in response to a signal generated by the computer processing module; and
    a remote central computing apparatus adapted to receive data from the device;
    wherein data relating to the environmental parameters and the state of the valve is transmitted via the radiofrequency transmitter to the remote central computing apparatus and data relating to the environmental parameters and the state of the valve is received by the remote central computing apparatus, stored in a database and analysed to establish patterns of water usage; and
    wherein the electrical actuator moves in response to a signal generated by the computer processing module.

2. A computer network system according to claim 1 wherein the signal transmitted by the computer processing module causes the device to prevent water flow through a pipe.

3. A computer network system according to claim 1 wherein the remote central computing apparatus relays data to one or more further data processing devices.

4. A computer network system according to claim 1, wherein the remote central computing apparatus receives data from a plurality of devices.

5. A computer network system according to claim 1 wherein the detectors comprise a flowmeter.

6. The computer network system according to claim 5 wherein the flowmeter is also a hydroelectric power generator.

7. The computer network system according to claim 1 wherein the radiofrequency transmitter and radiofrequency receiver are both comprised within a transceiver.

8. The computer network system according to claim 1 wherein the radiofrequency transmitter and radiofrequency receiver are low power, wide area network devices.

9. The computer network system according to claim 8 wherein the radiofrequency transmitter and radiofrequency receiver use spectrum below 1 GHz together with a direct sequence spread spectrum modulation.

10. The computer network system according claim 1, which transmits a signal at regular intervals regardless of the status of the device.

11. A computer network system according to claim 1 wherein the device transmits a signal in the event that the charge held in the electrical storage means reaches a certain level.

12. A device for use in the computer network system of claim 1.

\* \* \* \* \*